(12) United States Patent
Yamaguchi et al.

(10) Patent No.: US 12,253,260 B2
(45) Date of Patent: Mar. 18, 2025

(54) HIGH-TEMPERATURE OXYGEN GENERATION DEVICE AND HIGH-TEMPERATURE OXYGEN GENERATION METHOD

(71) Applicant: TAIYO NIPPON SANSO CORPORATION, Tokyo (JP)

(72) Inventors: Masashi Yamaguchi, Tokyo (JP); Yasuyuki Yamamoto, Tokyo (JP); Yoshiyuki Hagihara, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 451 days.

(21) Appl. No.: 17/762,416

(22) PCT Filed: Sep. 11, 2020

(86) PCT No.: PCT/JP2020/034460
§ 371 (c)(1),
(2) Date: Mar. 22, 2022

(87) PCT Pub. No.: WO2021/060022
PCT Pub. Date: Apr. 1, 2021

(65) Prior Publication Data
US 2022/0341589 A1 Oct. 27, 2022

(30) Foreign Application Priority Data

Sep. 27, 2019 (JP) .................... 2019-177860

(51) Int. Cl.
*F23D 14/22* (2006.01)
*F23D 14/66* (2006.01)
*F23D 14/78* (2006.01)

(52) U.S. Cl.
CPC ............ *F23D 14/22* (2013.01); *F23D 14/66* (2013.01); *F23D 14/78* (2013.01)

(58) Field of Classification Search
CPC .......... F23L 7/007; F23D 14/22; F23D 14/78; F23D 14/66; F23D 14/32
See application file for complete search history.

(56) References Cited

U.S. PATENT DOCUMENTS

| 4,642,047 | A | * | 2/1987 | Gitman | .................... | F23G 7/065 |
| | | | | | | 431/351 |
| 4,928,605 | A | * | 5/1990 | Suwa | ........................ | F23D 1/00 |
| | | | | | | 431/11 |
| 5,149,261 | A | * | 9/1992 | Suwa | ........................ | F23D 1/00 |
| | | | | | | 431/207 |

(Continued)

FOREIGN PATENT DOCUMENTS

| CN | 85109089 A | 1/1987 |
| CN | 101626976 B | 2/2013 |

(Continued)

OTHER PUBLICATIONS

Taiwanese Office Action mailed Jan. 26, 2024 in Taiwanese Application No. 109132086, with English translation, 10 pages.

(Continued)

*Primary Examiner* — Ko-Wei Lin
(74) *Attorney, Agent, or Firm* — Nixon & Vanderhye P.C.

(57) ABSTRACT

The object of the present invention is to provide a high-temperature oxygen generation device and a high-temperature oxygen generation method which can efficiently supply preheated high-temperature oxygen gas regardless of pressure conditions from normal pressure to high pressure, without requiring upsizing or expansion of the equipment, and the present invention provides a high-temperature oxygen generation device (10) in which a high-temperature gas (G4) and an oxygen gas (G3) to be heated are mixed to generate a high-temperature oxygen gas (G5), wherein the high-temperature oxygen generation device (10) includes a burner (1) which generates the high-temperature gas (G4), and a preheating chamber (7) which is provided on the downstream side of the burner (1) and mixes the high- (Continued)

temperature gas (G4) and the oxygen gas (G3) to be heated, and the burner (1) includes a combustion chamber (5) which forms a flame by a fuel gas (G1) and an oxygen gas (G2) for combustion, a fuel flow path (2) which supplies the fuel gas (G1) into the combustion chamber (5), a first oxygen flow path (3) and a second oxygen flow path (4) which supply the oxygen gas (G2) for combustion into the combustion chamber (5), and a flow path (6) for oxygen to be heated which communicates with the preheating chamber (7), and supplies the oxygen gas (G3) to be heated toward the preheating chamber (7).

3 Claims, 3 Drawing Sheets

(56) References Cited

U.S. PATENT DOCUMENTS

| | | | |
|---|---|---|---|
| 5,714,113 | A * | 2/1998 | Gitman ............... F27D 99/0033 432/13 |
| 6,190,158 | B1 | 2/2001 | Legiret et al. |
| 2006/0000395 | A1 * | 1/2006 | Joshi .................... F23D 14/583 110/267 |
| 2010/0094071 | A1 | 4/2010 | Olbert et al. |
| 2018/0038590 | A1 * | 2/2018 | Yamamoto ............. F23D 14/58 |

FOREIGN PATENT DOCUMENTS

| | | |
|---|---|---|
| CN | 102732668 B | 2/2014 |
| CN | 107250669 A | 10/2017 |
| JP | 61-18082 | 5/1986 |
| JP | 62-500010 | 1/1987 |
| JP | 62-116816 | 5/1987 |
| JP | 6-29659 | 4/1994 |
| JP | 2000-193215 | 7/2000 |
| JP | 2011-526998 | 10/2011 |
| KR | 10-0893266 | 4/2009 |
| WO | 86/01131 | 2/1986 |
| WO | 2010/002762 | 1/2010 |

OTHER PUBLICATIONS

Notification of the First Office Action mailed Mar. 1, 2024 in Chinese Application No. 202080059020.X, with English translation, 15 pages.
International Search Report for PCT/JP2020/034460 dated Nov. 24, 2020, 5 pages.
Written Opinion of the ISA for PCT/JP2020/034460 dated Nov. 24, 2020, 4 pages.
Extended European Search Report mailed Oct. 5, 2023 in European Application No. 20870209.2, 6 pages.

* cited by examiner

HIGH-TEMPERATURE OXYGEN GENERATION DEVICE AND HIGH-TEMPERATURE OXYGEN GENERATION METHOD

This application is the U.S. national phase of International Application No. PCT/JP2020/034460 filed Sep. 11, 2020 which designated the U.S. and claims priority to JP Patent Application No. 2019-177860 filed Sep. 27, 2019, the entire contents of each of which are hereby incorporated by reference.

TECHNICAL FIELD

The present invention relates to a high-temperature oxygen generation device which generates high-temperature oxygen gas, and a high-temperature oxygen generation method using the high-temperature oxygen generation device.

BACKGROUND ART

Conventionally, for heating in an industrial furnace, for example, a burner which generates a flame by a fuel gas and an oxidizing agent has been used. Air is generally used as the oxidizing agent to be supplied into the burner. However, oxygen-enriched air in which oxygen is mixed with air or oxygen may be used from the viewpoint of improving heating efficiency and energy saving.

Further, in order to further improve the heating efficiency, for example, a technique of obtaining a high combustion temperature by using a preheated oxidizing agent is also adopted.

Examples of the means for preheating the oxidizing agent include a heat exchange type in which the oxidizing agent is indirectly preheated by heat-exchange with exhaust gas from the furnace, and an electric type in which the oxidizing agent is heated by an electric heater. Further, there is also a direct combustion type in which combustion gas and the oxidizing agent to be preheated are directly mixed (see, for example, Patent Documents 1 and 2).

PRIOR ART DOCUMENTS

Patent Literature

Patent Document 1: Published Japanese Translation No. 2011-526998 of the PCT International Publication
Patent Document 2: Japanese Unexamined Patent Application, First Publication No. Sho 62-116816

SUMMARY OF INVENTION

Problem to be Solved by the Invention

When the oxidizing agent is indirectly preheated by the heat exchange type means, it takes time to preheat, so it is not suitable when the preheated oxidizing agent is used intermittently. In addition, since equipment for recovering the exhaust gas used for heat exchange is required, there is a disadvantage in that the introduction cost is high.

In addition, in a case of heating the oxidizing agent by the electric type means, when the flow rate of the oxidizing agent is large or when a high-temperature gas is required, which require a large power output, the scale of the equipment becomes large. Thereby, there is a risk of cost disadvantages as described above. In addition, it may not be applicable depending on the installation conditions.

On the other hand, the direct combustion type means disclosed in Patent Documents 1 and 2 has a disadvantage in that the oxygen concentration of the oxidizing agent is lowered by the amount of the combustion gas, but the equipment scale can be reduced. In addition, since the time required for preheating is short, it is also suitable for intermittent operation of the device.

For example, when oxygen burners and oxygen lances used in electric furnaces are used to heat or fusion-cut scraps efficiently, or to blow the fuel gas and the oxidizing agent over long distances, the ejection velocity of each gas used is supersonic. Thus, when the ejection velocity of the fuel gas or the oxidizing agent is supersonic, the supply pressure becomes high. For example, when the ejection velocity is Mach 1, a supply pressure of about 0.1 MPaG is required, and when the ejection velocity is Mach 2, a supply pressure of about 0.7 MPaG is required.

As described above, the conventional technique disclosed in Patent Documents 1 and 2 ejects a high-temperature oxidizing agent generated by a direct-combustion type oxygen preheating device. Since the techniques disclosed in Patent Documents 1 and 2 are considered to be techniques assuming a supply pressure of about atmospheric pressure, it is difficult to use a burner using these techniques in a high-pressure environment.

For example, when generating a high-temperature gas of 0.7 MPaG, the outlet pressure of the preheating burner is 0.7 MPaG. Therefore, the ejection velocity of each gas from the burner is about ⅛ of the velocity when the supply pressure is atmospheric pressure. Therefore, in a burner designed assuming a supply pressure near atmospheric pressure, the ejection velocity becomes slow, and there is a risk of misfire or flashback.

On the other hand, when the supply pressure is high, the volume is compressed even at the same flow rate, so that the required space inside the device is also small. Therefore, in the high-temperature oxygen generation device designed assuming the supply pressure of atmospheric pressure (normal pressure), the preheating chamber becomes excessively large. Accordingly, there is a disadvantage in that the preheating efficiency is lowered and the preheating temperature is lowered, or a large amount of the fuel gas must be used. As described above, when the amount of the fuel gas used increases, there is a problem in that not only does the operating cost increase, but also that the oxygen concentration decreases.

Contrary to the above, when a device with an ejection velocity set assuming use at high pressure is used under atmospheric pressure conditions, the ejection velocity of each gas may become too large and the flame may rise, resulting in misfire.

The present invention has been made in view of the above problems, and the object of the present invention is to provide a high-temperature oxygen generation device which has a specification with high supply pressure, but can also be used under atmospheric pressure, and can efficiently supply preheated high-temperature oxygen gas regardless of pressure conditions from normal pressure to high pressure without requiring upsizing or expansion of the equipment, and a high-temperature oxygen generation method using the high-temperature oxygen generation device.

Means for Solving the Problem

In order to solve the problems, the present invention provides the following high-temperature oxygen generation devices.

(1) A high-temperature oxygen generation device in which a high-temperature gas and an oxygen gas to be heated are mixed to generate a high-temperature oxygen gas, wherein the high-temperature oxygen generation device includes a burner which generates the high-temperature gas, and a preheating chamber which is provided on the downstream side of the burner and mixes the high-temperature gas and the oxygen gas to be heated, and the burner includes a combustion chamber which forms a flame by a fuel gas and an oxygen gas for combustion, a fuel flow path which supplies the fuel gas into the combustion chamber, a flow path for oxygen for combustion which supplies the oxygen gas for combustion into the combustion chamber, and a flow path for oxygen to be heated which communicates with the preheating chamber, and supplies the oxygen gas to be heated toward the preheating chamber.

(2) The high-temperature oxygen generation device according to (1) above, wherein the burner includes a first oxygen flow path which is provided on the center axis of the burner and ejects the oxygen gas for combustion on the center axis of the burner as the flow path for oxygen for combustion, the fuel flow path which is arranged around the first oxygen flow path, and ejects the fuel gas on the axis direction of the burner, and a second oxygen flow path which is arranged around the fuel flow path, and ejects the oxygen gas for combustion so as to be directed toward the center axis of the burner while inclining with respect to the center axis of the burner as the flow path for oxygen for combustion, a flame is formed by the fuel gas ejected from the fuel flow path and the oxygen gas for combustion ejected from the first oxygen flow path and the second oxygen flow path in the combustion chamber, and the flow path for oxygen to be heated communicates with the preheating chamber, arranged around the second oxygen flow path, ejects the oxygen gas to be heated around the flame, and supplies the oxygen gas to be heated toward the preheating chamber.

(3) The high-temperature oxygen generation device according to (1) or (2) above, the high-temperature oxygen generation device further includes a cooling jacket which cools the burner or both the burner and the preheating chamber.

In order to solve the problems, the present invention provides the following high-temperature oxygen generation method.

(4) A high-temperature oxygen generation method using the high-temperature oxygen generation device according to (2) above, in a case when the high-temperature oxygen is supplied at a maximum pressure, an average velocity of the fuel gas in the fuel flow path of the burner is U1, an average velocity of the oxygen gas for combustion in the first oxygen flow path is U2, and an average velocity of the oxygen gas for combustion in the second oxygen flow path is U3, these average velocities U1, U2, and U3 satisfy the following equations (1) to (3), and in a case at the rated flow rate under atmospheric pressure conditions, an average velocity U4 of a mixed gas of the fuel gas and the oxygen gas for combustion on an outlet side of the combustion chamber satisfies the following equation (4).

$$10 \text{ (m/s)} \leq U1 \leq 60 \text{ (m/s)} \quad (1)$$

$$20 \text{ (m/s)} \leq U2 \leq 120 \text{ (m/s)} \quad (2)$$

$$20 \text{ (m/s)} \leq U3 \leq 120 \text{ (m/s)} \quad (3)$$

$$U4 \leq 60 \text{ (m/s)} \quad (4)$$

Effects of the Invention

In the high-temperature oxygen generation device according to the present invention, the burner includes the combustion chamber which forms a flame by the fuel gas and the oxygen gas for combustion, the fuel flow path which supplies the fuel gas into the combustion chamber, the flow path for oxygen for combustion which supplies the oxygen gas for combustion into the combustion chamber, and a flow path for oxygen to be heated which communicates with the preheating chamber to supply the oxygen gas to be heated. In this way, a supply flow path for oxygen gas is divided into the flow path for the oxygen gas for combustion which is used in the combustion with the fuel gas and the flow path for oxygen gas to be heated which is used in mixing with the high-temperature gas after combustion, and the combustion chamber is arranged independently of the preheating chamber. As a result, according to the high-temperature oxygen generation device of the present invention, it is possible to prevent the flame from misfiring due to the influence of the flow of the oxygen gas to be heated from the flow path for oxygen to be heated. Further, the cooling effects on the burner and the inner wall of the high-temperature oxygen generation device can also be obtained by the flow path for oxygen to be heated in which the oxygen gas to be heated which is not subjected to combustion flows.

As a result, the high-temperature oxygen generation device of the present invention has a specification with high supply pressure, but can also be used under atmospheric pressure, and can efficiently supply preheated high-temperature oxygen gas regardless of pressure conditions from normal pressure to high pressure, without requiring upsizing or expansion of the equipment.

In addition, according to the high-temperature oxygen generation method of the present invention, in a case when the high-temperature oxygen is supplied at the maximum pressure, the average velocity of the fuel gas in the fuel flow path of the burner is U1, the average velocity of the oxygen gas for combustion in the first oxygen flow path is U2, and the average velocity of the oxygen gas for combustion in the second oxygen flow path is U3, these average velocities U1, U2, and U3 are limited in the optimal ranges, and in a case at the rated flow rate under atmospheric pressure conditions, the average velocity U4 of a mixed gas of the fuel gas and the oxygen gas for combustion on the outlet side of the combustion chamber is limited to the optimal range. As a result, it is possible to prevent the flame from being blown off due to excessive velocity, in addition to flashback and misfire due to a decrease in velocity.

As a result, according to the high-temperature oxygen generation method of the present invention, it is possible to supply preheated high-temperature oxygen gas regardless of pressure conditions from normal pressure to high pressure, without requiring upsizing or expansion of the equipment.

DETAILED DESCRIPTION OF THE PREFERRED EMBODIMENTS

Figure 1:
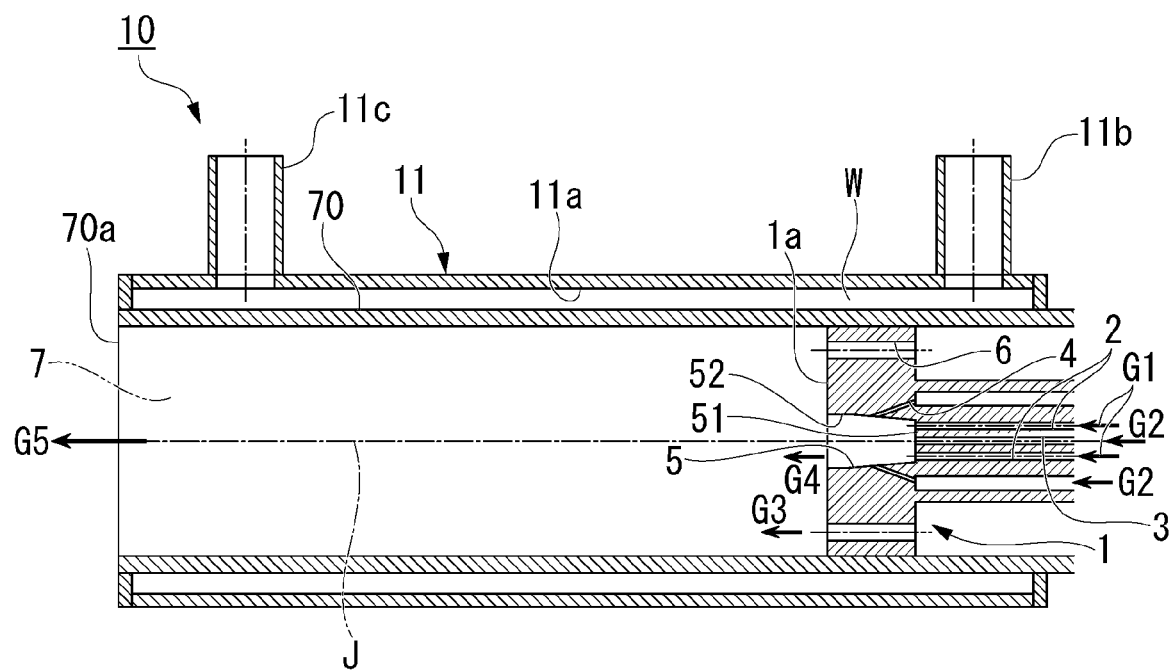
FIG. 1 is a diagram schematically showing a high-temperature oxygen generation device according to an embodiment of the present invention, and is a cross-sectional view taken along the axial direction of the burner.

Hereinafter, embodiments of the high-temperature oxygen generation device and the high-temperature oxygen generation method according to the present invention will be described with reference to FIGS. 1 to 4 as appropriate. In addition, in the drawings used in the following explanation, in order to make the features easy to understand, the featured parts may be enlarged for convenience, and the dimensional ratios of each component may not be the same as the actual ones. Further, although the materials and the like exemplified in the following description are examples, the present invention is not limited thereto, and the present invention can be appropriately modified without changing the gist thereof.

Structure of High-Temperature Oxygen Generation Device

The configuration of the high-temperature oxygen generation device 10 of the present embodiment will be described in detail below.

Figure 2:
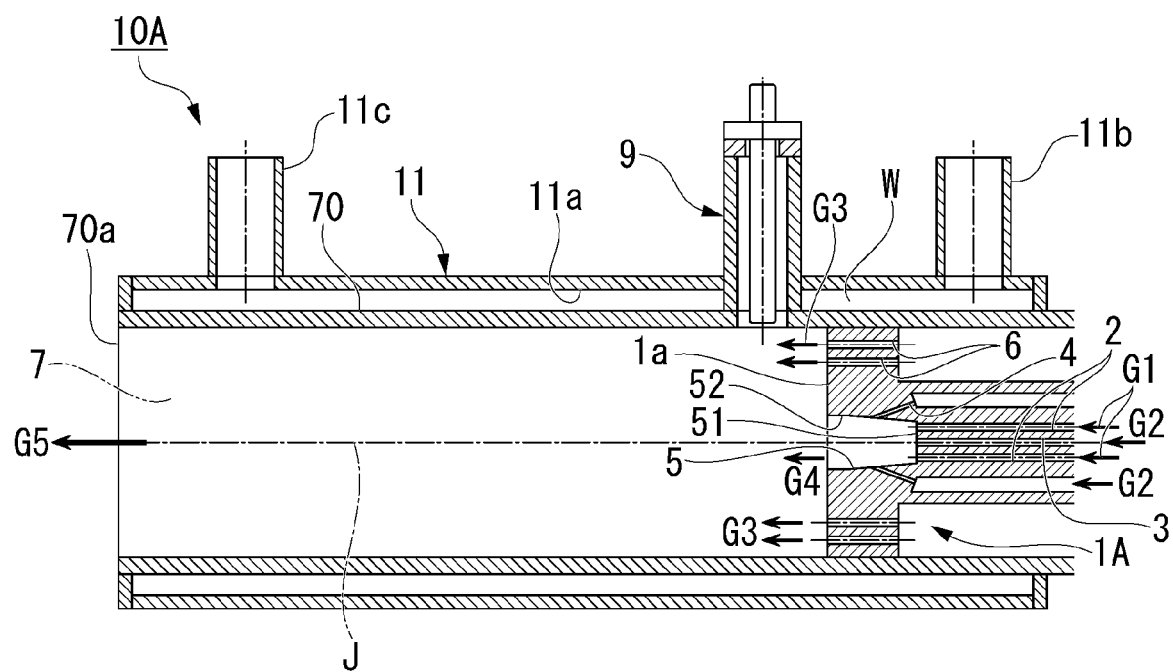
FIG. 2 is a diagram schematically showing a high-temperature oxygen generation device according to another embodiment of the present invention, which has a burner different from the burner provided in the high-temperature oxygen generation device shown in FIG. 1, and further an ignition burner, and is a cross-sectional view along the axial direction of the burner.
Figure 3:
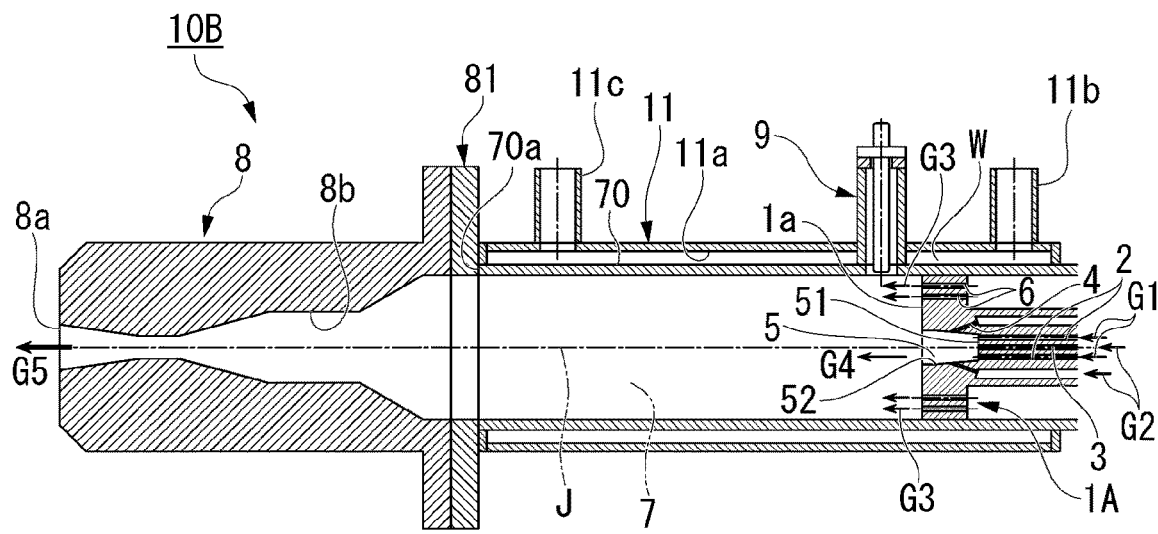
FIG. 3 is a diagram schematically showing a high-temperature oxygen generation device according to another embodiment of the present invention, in which an oxygen lance is further provided in the high-temperature oxygen generation device shown in FIG. 2, and is a cross-sectional view along the axial direction of the burner.
Figure 4:
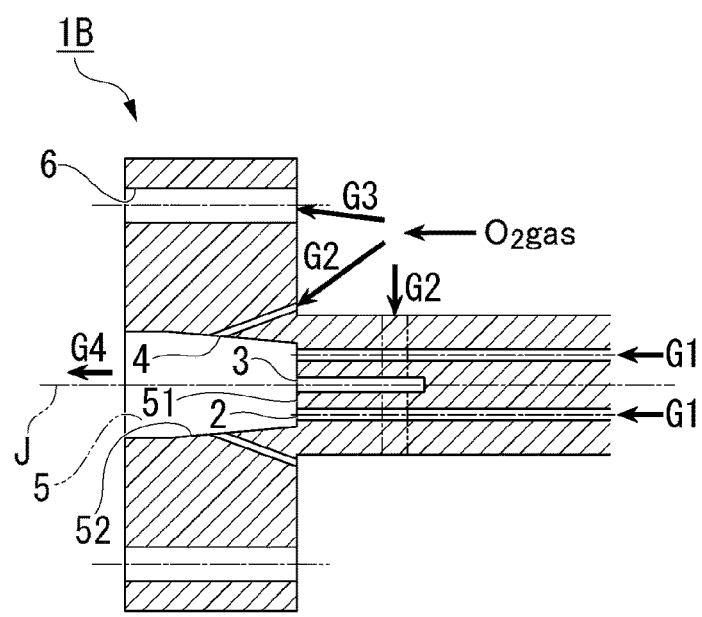
FIG. 4 is a diagram schematically showing a high-temperature oxygen generation device according to another embodiment of the present invention, and is a cross-sectional view of another burner provided in the high-temperature oxygen generation device along the axial direction of the burner.

FIG. 1 is a cross-sectional view showing a high-temperature oxygen generation device 10 of the present embodiment along the center axis J of the burner 1. FIG. 2 is a cross-sectional view showing another high-temperature oxygen generation device provided with a different burner 1A from the burner 1 shown in FIG. 1 and further provided with an ignition burner 9. FIG. 3 is a cross-sectional view showing a high-temperature oxygen generation device 10B, which is the high-temperature oxygen generation device 10A shown in FIG. 1 further provided with an oxygen lance 8. Further, FIG. 4 is a cross-sectional view showing another burner provided in the high-temperature oxygen generation device.

As shown in FIG. 1, the high-temperature oxygen generation device 10 of the present embodiment mixes high-temperature gas G4 and oxygen gas G3 to be heated to generate high-temperature oxygen gas G5. The high-temperature oxygen generation device 10 includes a burner 1 which generates the high-temperature gas G4, and a preheating chamber 7 which is provided on the downstream side of the burner 1 and mixes the high-temperature gas G4 and the oxygen gas G3 to be heated.

Further, in the high-temperature oxygen generation device 10, the burner 1 includes a combustion chamber 5 which forms a flame by the fuel gas G1 and oxygen gas G2 for combustion, a fuel flow path 2 which supplies the fuel gas G1 into the combustion chamber 5, flow paths for oxygen for combustion (see reference numerals 3 and 4 in FIG. 1) which supply the oxygen gas G2 for combustion into the combustion chamber 5, and a flow path 6 for oxygen to be heated which supplies the oxygen G3 to be heated into the preheating chamber 7.

More specifically, the burner 1 of the high-temperature oxygen generation device 10 of the present embodiment includes a first oxygen flow path 3 which is arranged on the center axis J of the burner 1 and ejects the oxygen gas G2 for combustion as the flow path for oxygen for combustion. In addition, as shown in FIG. 1, the fuel flow path 2 is arranged around the first oxygen flow path 3, that is, outside the first oxygen flow path 3 with respect to the center axis J, and ejects the fuel gas G2 in the axial direction of the burner 1. Further, the burner 1 includes a second oxygen flow path 4 which is arranged around the fuel flow path 2 and ejects the oxygen gas G2 for combustion so as to be directed toward the center axis J while inclining with respect to the center axis J of the burner 1 as the flow path for oxygen for combustion.

The fuel flow path 2, the first oxygen flow path 3, and the second oxygen flow path 4 are opened to the combustion chamber 5. The flame is formed in the combustion chamber 5 by the fuel gas G1 ejected from the fuel flow path 2 and the oxygen gas G2 for combustion ejected from the first oxygen flow path 3 and the second oxygen flow path 4.

Further, the flow path 6 for oxygen to be heated communicates with the preheating chamber 7 and is arranged around the second oxygen flow path 4. In the illustrated example, the flow path 6 for oxygen to be heated is open to the preheating chamber 7. The flow path 6 for oxygen to be heated supplies the oxygen gas G3 to be heated toward the preheating chamber 7 by ejecting the oxygen gas G3 to be heated from around the flame.

Further, the high-temperature oxygen generation device 10 of the illustrated example further includes a cooling jacket 11 for cooling either one or both of the burner 1 and the preheating chamber 7.

Examples of the fuel gas G1 used in the present embodiment include natural gas. In addition, examples of the fuel gas G1 include a gas containing a fuel which satisfies conditions such as being flammable, being insoluble in water, and having a large calorific value per unit volume. Specific examples of the fuel gas G1 include gases containing hydrocarbon fuels such as liquefied petroleum gas (LPG), city gas, and methane.

Further, examples of the oxygen gas G2 for combustion and oxygen gas G3 to be heated used in the present embodiment include oxygen-enriched air and oxygen.

As shown in FIG. 1, the burner 1 includes the combustion chamber 5, which has a bottomed conical shape and opens so that a tip 1a side in the flame-forming direction expands in diameter, and the high-temperature gas G4 is generated by forming the flame in the combustion chamber 5.

In the illustrated example, the combustion chamber 5 is a concave portion having a bottomed conical shape, which opens so that the tip 1a side in the flame-forming direction expands in diameter. The vertical cross section of the combustion chamber 5 is substantially trapezoidal. As described above, the burner 1 generates a flame in the combustion chamber 5 to generate the high-temperature gas G4 toward the downstream side of the burner 1, that is, the preheating chamber 7.

In the combustion chamber 5, the gradient angle of the side wall 52 from the bottom portion 51 on the proximal end side to the distal end 1a side may be constant. However, as shown in the illustrated example, it is more preferable that a part of the tip 1a side have a cylindrical shape because a stable flame can be obtained.

As described above, the fuel flow path 2 is arranged outside the center axis J, that is, around the first oxygen flow path 3, which will be described in detail later, and ejects the fuel gas G1 in the axial direction of the burner 1.

The opening of the fuel flow path 2 is arranged so as to open at the bottom 51 of the combustion chamber 5, and is provided so as to eject the fuel gas G1 supplied from the fuel flow path 2 toward the inside of the combustion chamber 5.

Although detailed illustration is omitted, the fuel flow path 2 is arranged, for example, on the circumference centered on the center axis J so as to surround the first oxygen flow path 3 provided on the center axis J. There are multiple fuel flow paths 2 parallel to each other and evenly spaced.

As long as the openings of the plurality of fuel flow paths 2 are opened to the inside of the combustion chamber 5, the arrangement interval, the number, the shape, and the like are not particularly limited and can be arbitrarily set.

As described above, the first oxygen flow path (flow path for oxygen for combustion) 3 is arranged on the center axis J of the burner 1, and ejects the oxygen gas G2 for combustion in the axial direction of the burner 1.

The opening of the first oxygen flow path 3 is also arranged so as to open at the bottom 51 of the combustion chamber 5 like the fuel flow path 2. As a result, the oxygen gas G2 for combustion supplied from the first oxygen flow path 3 is ejected toward the combustion chamber 5.

As long as the opening of the first oxygen flow path 3 is open to the combustion chamber 5, the shape and the like of the opening of the first oxygen flow path 3 is not particularly limited, and can be arbitrarily set.

As described above, the second oxygen flow path (flow path for oxygen for combustion) 4 is arranged around the fuel flow path 2. The vicinity of the tip of the second oxygen flow path 4, the tip side from the bottom 51 of the combustion chamber 5 (hereinafter sometimes referred to as "the vicinity of the tip of the fuel flow path 2") is inclined toward the center axis J side of the burner 1. As a result, the oxygen gas G2 for combustion is ejected toward the center axis J side. That is, although detailed illustration is omitted, a plurality of the second oxygen flow path 4 are arranged outside the fuel flow path 2 on the circumference centered on the center axis J at equal intervals so as to surround the fuel flow path 2. The vicinity of the tip thereof is gradually inclined toward the center axis J side toward the tip 1a side of the burner 1. Further, in the example shown in FIG. 1, the opening of the second oxygen flow path 4 is arranged so as to open at the side wall 52 of the combustion chamber 5.

The angle at the vicinity of the tip of the second oxygen flow path 4 with respect to the center axis J, that is, the merging angle of the oxygen gas G2 for combustion ejected from the second oxygen flow path 4 with respect to the fuel gas G1 ejected from the fuel flow path 2 and the oxygen gas G2 for combustion ejected from the first oxygen flow path 3 is not particularly limited. However, in consideration of combustion efficiency and the like, the angle is preferably in the range of 10° to 30°.

As long as the openings of the plurality of second oxygen flow paths 4 are also opened at the side wall 52 of the combustion chamber 5 as described above, the arrangement interval, the number, the shape, etc. are not particularly limited and can be arbitrarily set.

As described above, the flow path 6 for oxygen to be heated is arranged around the second oxygen flow path 4 and is open so as to communicate with the inside of the preheating chamber 7. In the example shown in FIG. 1, the flow path 6 for oxygen to be heated opens at the end face of the tip 1a of the burner 1.

There are multiple flow paths 6 for oxygen to be heated. Although detailed illustrations are omitted, the flow paths 6 for oxygen to be heated are arranged in parallel and evenly spaced so as to surround the second oxygen flow path 4 on the circumference centered on the center axis J.

The flow path 6 for oxygen to be heated opens at the end face of the tip 1a of the burner 1. As a result, flow path 6 for oxygen to be heated ejects the oxygen gas G3 to be heated from around the flame and supplies oxygen gas G3 to be heated toward the preheating chamber 7. That is, unlike the first oxygen flow path 3 and the second oxygen flow path 4, the flow path 6 for oxygen to be heated is a flow path through which the oxygen gas G3 to be heated flows, not a flow path through which the oxygen gas G2 for combustion flows. Therefore, the flow path 6 for oxygen to be heated opens to the preheating chamber 7 without opening in the combustion chamber 5.

As long as the opening of the flow path 6 for oxygen to be heated opens to the preheating chamber 7, the shape, and the like are not particularly limited and can be arbitrarily set.

The preheating chamber 7 is provided on the downstream side of the burner 1 and is a space at which the high-temperature gas G4 and the oxygen gas G3 to be heated are mixed. The preheating chamber 7 in the illustrated example has an internal space secured by a cylindrical tube 70. By arranging the burner 1 inside the cylindrical tube 70, the preheating chamber 7 is formed in the space between the burner 1 and the tip 70a of the cylindrical tube 70.

In the preheating chamber 7, the high-temperature gas G4 generated by the flame formed in the combustion chamber 5 of the burner 1 is supplied, and the oxygen gas G3 to be heated is also supplied through the flow path 6 for oxygen to be heated. As a result, the high-temperature oxygen gas G5 is generated in the preheating chamber 7. The high-temperature oxygen gas G5 generated is supplied from the tip 70a side of the cylindrical tube 70 toward the outside.

In the high-temperature oxygen generation device 10 of the example shown in FIG. 1, the downstream side of the preheating chamber 7 is open to the atmosphere, and the pressure at the outlet of each flow path provided in the burner 1 is atmospheric pressure.

The cooling jacket 11 is for cooling the burner 1 or both the burner 1 and the preheating chamber 7. The cooling jacket 11 of the illustrated example is for cooling both the burner 1 and the preheating chamber 7. That is, the cooling jacket 11 is cylindrical and has a double tube structure which covers the cylindrical tube 70 via an annular space. The annular space is a cooling water flow path 11a through which the cooling water W flows. The burner 1 and the preheating chamber 7 can be cooled by the flow of the cooling water W.

In the cooling jacket 11 of the illustrated example, the cooling water W is introduced from the inlet pipe 11b side, flows through the cooling water flow path 11a, and is discharged from the outlet pipe 11c. In the high-temperature oxygen generation device 10 of the present embodiment, when the cooling water W flows through the cooling water flow path 11a, the cooling water W cools the burner 1 and the cylindrical tube 70, so that both the burner 1 and the preheating chamber 7 can be cooled.

The cooling jacket 11 protects each component of the burner 1 from the high-temperature atmosphere and radiant heat caused by the flame, and suppresses transient heating in the combustion chamber 5.

The action and effects obtained by the high-temperature oxygen generation device 10 of the present embodiment will be described below.

Generally, when the ejection velocity of each gas ejected from the burner is slow, a flashback occurs or the jet is weak, so that it easily misfires due to the influence of an external disturbance. On the other hand, when the ejection velocity of each gas is too fast, the flame will rise, and in this case as well, a misfire is likely to occur. Further, in a burner using oxygen gas, since the flame temperature becomes a high-temperature exceeding 2000° C., it is necessary to provide appropriate protection so that the nozzle is not melted.

In order to solve the problems, in the high-temperature oxygen generation device 10 of the present embodiment, the burner 1 includes the combustion chamber 5 which forms the flame by the fuel gas G1 and the oxygen gas G2 for combustion, the fuel flow path 2 which supplies the fuel gas G1 into the combustion chamber 5, the flow path for oxygen for combustion (the first oxygen flow path 3 and the second oxygen flow path 4) which supplies the oxygen gas G2 for combustion into the combustion chamber 5, and the flow path 6 for oxygen to be heated which supplies the oxygen gas G3 to be heated toward the preheating chamber 7. In other words, in the high-temperature oxygen generation device 10, the supply flow path for oxygen gas is divided into the flow path (first oxygen flow path 3 and second oxygen flow path 4) for the oxygen gas G2 for combustion which is used in the combustion with the fuel gas G1 and the flow path (the flow path 6 for oxygen to be heated) for oxygen gas G3 to be heated which is used in mixing with the high-temperature gas after combustion, and the combustion chamber 5 is arranged independently of the preheating chamber 7.

As a result, according to the high-temperature oxygen generation device 10, it is possible to prevent the flame formed by the fuel gas G1 and the oxygen gas G2 for combustion from misfiring due to the influence of the flow of oxygen gas G3 to be heated from the flow path 6 for oxygen to be heated. Further, since the flow path 6 for oxygen to be heated through which the oxygen gas G3 to be heated, which is not subjected to combustion, is provided along the center axis J of the burner 1, cooling effects on the entire burner 1 can be obtained, and at the same time, cooling effects on the inner wall of the cylindrical tube 70 can also be obtained.

More specifically, in the high-temperature oxygen generation device 10 of the present embodiment, the first oxygen flow path 3 is arranged on the center axis J of the burner 1, and ejects the oxygen gas G2 for combustion in the axial direction of the burner 1. Further, the fuel flow path 2 is arranged around the first oxygen flow path 3 and ejects the fuel gas G1 in the axial direction of the burner 1. Further, the second oxygen flow path 4 is arranged around the fuel flow path 2, and the vicinity of the tip thereof is inclined with respect to the center axis J of the burner 1. Therefore, the oxygen gas G2 for combustion is ejected toward the center axis J side.

In this way, the fuel gas G1 is sandwiched by the oxygen gas G2 for combustion ejected from the first oxygen flow path 3 and the second oxygen flow path 4. As a result, the combustion state is maintained, and the side wall 52 and the bottom 51 of the combustion chamber 5 can be protected by the oxygen flow by the oxygen gas G2 for combustion ejected from the second oxygen flow path 4 so that the temperature of the side wall 52 and the bottom 51 does not rise too much.

Further, the oxygen gas G3 to be heated is ejected axially from the flow path 6 for oxygen to be heated toward the periphery of the flame formed in the combustion chamber 5 to generate the high-temperature gas G4. Then, the high-temperature gas G4 generated and the oxygen gas G3 to be heated are mixed in the preheating chamber 7. As a result, oxygen heated to a high-temperature, that is, the high-temperature oxygen gas G5 can be discharged to the outside.

On the other hand, for example, in the conventional technique as disclosed in Patent Document 2, the fuel flow path is arranged in the center of the burner, and the oxygen flow path is arranged around the fuel flow path. With such a configuration, it becomes extremely difficult to maintain the flame when the ejection velocity of each gas is large.

According to the high-temperature oxygen generation device 10 of the present embodiment, as shown in FIG. 1, the fuel flow path 2 is sandwiched between the first oxygen flow path 3 and the second oxygen flow path 4. Accordingly, even when the ejection velocity of each gas is large, the flame can be stably maintained.

Further, when the high-temperature oxygen generation device 10 of the present embodiment is further provided with the cooling jacket 11 as shown in the illustrated example, the following effects can be obtained.

By providing the cooling jacket 11, for example, since the burner 1 and the cooling water W are in direct contact with each other, the burner 1 can be sufficiently cooled and can be prevented from being melted. Further, since the burner 1 and the cooling water W are in contact with each other via another structure (the cylindrical tube 70 in the illustrated example), the burner 1 can be sufficiently cooled and can be prevented from being melted. Further, thermal stress can prevent the burner 1 or the high-temperature oxygen generation device 10 as a whole from being deformed or damaged. Further, it is possible to minimize the occurrence of fatigue fracture due to repeated application of thermal stress, and it is possible to extend the service life.

In the illustrated example, the cooling jacket 11 is provided so as to cover from the burner 1 to the preheating chamber 7, but the present invention is not limited to this embodiment. For example, the cooling jacket 11 may cool only the burner 1, and the preheating chamber 7 may be protected by forming the inner wall of the cylindrical tube 70 with a refractory material.

Further, the high-temperature oxygen generation device according to the present invention is not limited to the embodiment as shown in FIG. 1.

For example, a burner 1A, in which the flow path 6 for oxygen to be heated is arranged in two rows, the inner peripheral side and the outer peripheral side, and a part of the side wall 52 of the combustion chamber 5, that is, the tip 1a side has a cylindrical shape, may be provided as in the high-temperature oxygen generation device 10A shown in FIG. 2.

Further, in the high-temperature oxygen generation device 10A shown in FIG. 2, an ignition burner 9 is provided near the tip of the burner 1A so as to penetrate the cooling jacket 11 and the cylindrical tube 70. Generally, the burner for high-temperature gas generation provided in the high-temperature oxygen generation device requires an ignition source. Therefore, the high-temperature oxygen generation device 10A in the example shown in FIG. 2 is provided with the ignition burner 9. Also, in the high-temperature oxygen generation device 10A of the example shown in FIG. 2, the downstream side of the preheating chamber 7 is in a state of being open to the atmosphere, and the pressure at each flow path outlet provided in the burner 1A is atmospheric pressure.

Further, as in the high-temperature oxygen generation device 10B shown in FIG. 3, an oxygen lance 8 can be further provided to the downstream side of the preheating chamber 7 in the high-temperature oxygen generation device 10A shown in FIG. 2. As shown in the illustrated example, the oxygen lance 8 is connected to the tip 70a of the preheating chamber 7 via the flange 81. The flow path area of an internal flow path 8b of the oxygen lance 8 becomes narrower toward the discharge port 8a side, and the flow path area is slightly widened only in the vicinity of the discharge port 8a. As a result, according to the high-temperature oxygen generation device 10B, the high-temperature oxygen gas G5 ejected from the discharge port 8a of the oxygen lance 8 has a high ejection velocity. At the same time, according to the high-temperature oxygen generation device 10B, preheating can be performed under each gas flow rate condition similar to the atmospheric pressure condition in the high-temperature oxygen generation device 10A shown in FIG. 2, and the like.

Further, the burner used for the high-temperature oxygen generation device is not limited to the burners 1 and 1A shown in FIGS. 1 to 3. For example, as in the burner 1B shown in FIG. 4, the supply of oxygen gas to the first oxygen flow path 3, the second oxygen flow path 4, and the flow path 6 for oxygen to be heated may be branched from the same source, and the same oxygen gas may be used for the oxygen gas G2 for combustion and the oxygen gas G3 to be heated.

High-Temperature Oxygen Generation Method

The high-temperature oxygen generation method of the present embodiment is a method of generating the high-temperature oxygen gas G5 by using the high-temperature oxygen generation device 10 of the embodiment above.

That is, in the high-temperature oxygen generation method of the present embodiment, in a case when the high-temperature oxygen is supplied at the maximum pressure, the average velocity of the fuel gas G1 in the fuel flow path 2 of the burner 1 is U1, the average velocity of the oxygen gas G2 for combustion in the first oxygen flow path 3 is U2, and the average velocity of the oxygen gas G2 for combustion in the second oxygen flow path 4 is U3, these average velocities U1, U2, and U3 satisfy the following equations (1) to (3), and in a case at the rated flow rate under atmospheric pressure condition, the average velocity U4 of a mixed gas of the fuel gas G1 and the oxygen gas G2 for combustion on the outlet side of the combustion chamber 5 satisfies the following equation (4).

$$10 \text{ (m/s)} \leq U1 \leq 60 \text{ (m/s)} \tag{1}$$

$$20 \text{ (m/s)} \leq U2 \leq 120 \text{ (m/s)} \tag{2}$$

$$20 \text{ (m/s)} \leq U3 \leq 120 \text{ (m/s)} \tag{3}$$

$$U4 \leq 60 \text{ (m/s)} \tag{4}$$

As described above, when high-temperature oxygen is generated by a conventional method using a conventional device, the velocity is lower under high-pressure conditions than that under atmospheric pressure conditions. Therefore, in the high-temperature oxygen generation method of the present embodiment, when the average velocity U1 of the fuel gas G1, the average velocity U2 of the oxygen gas G2 for combustion in the first oxygen flow path 3, and the average velocity U3 of the oxygen gas G2 for combustion in the second oxygen glow path 4 are the assumed maximum pressures, the average velocities U1, U2, and U3 satisfy the equations (1) to (3) above. As a result, it is possible to prevent flashbacks and misfires due to a decrease in velocity, as well as blow-off of the flame due to excessive velocity.

In the high-temperature oxygen generation method of the present embodiment, when the high-temperature oxygen is supplied at the maximum pressure, the average velocities U1, U2, and U3 satisfy the following equations (1) to (3), respectively, and a stable flame can be maintained even under atmospheric pressure. Further, in the present embodiment, when the average velocity U4 of the mixed gas of the fuel gas G1 and the oxygen gas G2 for combustion at the outlet side of the combustion chamber 5 is the rated flow rate under atmospheric pressure conditions, it is possible to further improve the stability of the flame by designing the burner 1 so as to satisfy equation (4) above.

According to the present embodiment, by using the high-temperature oxygen generation device 10 having the configuration above, each gas can form a stable flame after being ejected into the combustion chamber 5 at high pressure. Further, according to the present embodiment, since the fuel flow path 2 is sandwiched between the first oxygen flow path 3 and the second oxygen flow path 4 under atmospheric pressure at which the ejection velocity is large, and the average velocity of each gas in the combustion chamber 5 is maintained appropriately, it is possible to maintain a sufficiently stable flame.

Action and Effects

As described above, in the high-temperature oxygen generation device 10 of the present embodiment, the burner 1 includes the combustion chamber 5 which forms the flame with the fuel gas G1 and the oxygen gas G2 for combustion, the fuel flow path 2 which supplies the fuel gas G1 into the combustion chamber 5, the first oxygen flow path 3 and the second oxygen flow path 4 which supply the oxygen gas G2 for combustion into the combustion chamber 5, and the flow path 6 for oxygen to be heated which supplies the oxygen gas G3 to be heated into the preheating chamber 7. In this way, the oxygen gas supply flow path is divided into the flow path for the oxygen gas G2 for combustion which is used for combustion with the fuel gas G1, and the flow path for the oxygen gas G3 to be heated which is used in mixing with the high-temperature gas G4 after combustion, and the combustion chamber 5 is arranged independently of the preheating chamber 7. Thereby, it is possible to prevent the flame from misfire due to the influence of the flow of the oxygen gas G3 to be heated from the flow path 6 for oxygen to be heated. In addition, the flow path 6 for oxygen to be heated through which the oxygen gas G3 to be heated, which is not subjected to combustion, can be used to cool the burner 1 and the cylindrical tube 70.

Therefore, the high-temperature oxygen generation device according to the present embodiment has a specification with high supply pressure, but can also be used under atmospheric pressure, and can efficiently supply the preheated high-temperature oxygen gas regardless of pressure conditions from normal pressure to high pressure, without requiring upsizing or expansion of the equipment.

In addition, according to high-temperature oxygen generation method of the present embodiment, in a case when the high-temperature oxygen is supplied at the maximum pressure, the average velocity of the fuel gas G1 in the fuel flow path 2 of the burner 1 is U1, the average velocity of the oxygen gas G2 for combustion in the first oxygen flow path 3 is U2, and the average velocity of the oxygen gas G2 for combustion in the second oxygen flow path 4 is U3, these average velocities U1, U2, and U3 are limited in the optimal ranges, and in a case at the rated flow rate under atmospheric pressure conditions, the average velocity U4 of a mixed gas of the fuel gas G1 and the oxygen gas G2 for combustion on the outlet side of the combustion chamber 5 is limited to the optimal range. As a result, it is possible to prevent the flame from being blown off due to excessive velocity, in addition to flashback and misfire due to a decrease in velocity.

Therefore, it is possible to supply the preheated high-temperature oxygen gas G5 regardless of the pressure conditions from normal pressure to high pressure and without requiring upsizing or expansion of equipment.

Although the preferred embodiments of the present invention have been described in detail above, the present invention is not limited to the specific embodiments as described above. Various modifications and changes are possible within the scope of the gist of the present invention described within the scope of claims.

EXAMPLES

Hereinafter, the high-temperature oxygen generation device and the high-temperature oxygen generation method according to the present invention will be described in more detail by examples, but the present invention is not limited thereto.

Example 1

In Example 1, a test was carried out using the high-temperature oxygen generation device 10A as shown in FIG. 2 including the burner 1A which generates the high-temperature gas G4, and the preheating chamber 7 which is provided on the downstream side of the burner 1A, and mixes the high-temperature gas G4 and the oxygen gas G3 to be heated. Specifically, the high-temperature oxygen generation device 10A was used, which is provided with the burner 1A including the combustion chamber 5 which forms a flame with the fuel gas G1 and the oxygen gas G2 for combustion, the fuel flow path 2 which supplies the fuel gas G1 into the combustion chamber 5, the first oxygen flow path 3 and the second oxygen flow path 4 which supply the oxygen gas G2 for combustion into the combustion chamber 5, and the flow path 6 for oxygen to be heated, which supplies the oxygen gas G3 to be heated toward the preheating chamber 7, and is arranged in two rows on the inner peripheral side and the outer peripheral side, and the ignition burner 9 which is the ignition source of the burner 1. The angle with respect to the center axis J at the vicinity of the tip of the second oxygen flow path 4 was set to 20°.

In the present example, the downstream side of the preheating chamber 7 was open to the atmosphere, and each flow path outlet provided in the burner 1A was set to the atmospheric pressure condition.

Then, the flow rate of the high-temperature oxygen gas G5 discharged from the preheating chamber 7 was set to 200 Nm³/h, and the preheating temperature of the high-temperature oxygen gas G5 was set to 500° C. As a result, it was clarified that the preheating temperature could be achieved under each condition shown in Table 1 below.

TABLE 1

| Test items | Test conditions |
|---|---|
| Flow rate of fuel gas (natural gas) [Nm$^3$/h] | 4 |
| Total flow rate of oxygen gas (high-temperature oxygen gas) [Nm$^3$/h] | 195 |
| Temperature of discharged gas (high-temperature oxygen gas) [° C.] | 500 |
| Oxygen concentration in discharged gas (high-temperature oxygen gas) [% by volume] | 92.8 |
| Average velocity U1 in fuel flow path [m/s] | 140 |
| Average velocity U2 in first oxygen flow path [m/s] | 520 |
| Average velocity U3 in second oxygen flow path [m/s] | 520 |
| Average velocity U4 at outlet of combustion chamber [m/s] (Mixed gas of fuel gas and oxygen gas for combustion) | 32 |

Example 2

In Example 2, the test was carried out using the high-temperature oxygen generation device 10B shown in FIG. 3 in which the oxygen lance 8 was further attached to the downstream side of the preheating chamber 7 in the high-temperature oxygen generation device 10A used in Example 1. Specifically, the high-temperature oxygen generation device 10B was used in the present example, which includes the oxygen lance 8 having the internal flow path 8b in which the flow path area becomes narrower toward the discharge port 8a side and the flow path area slightly expands only in the vicinity of the discharge port 8a to the downstream side of the preheating chamber 7.

The oxygen lance 8 has a specification with high supply pressure in which when the flow rate of the discharged high-temperature oxygen gas G5 is 200 Nm³/h and the preheating temperature of the high-temperature oxygen gas G5 is 500° C., the pressure on the inlet side of the oxygen lance 8 is 0.7 MPaG.

In the present example, as shown in Table 2 below, it was clarified that even when the oxygen lance 8 was used, the preheating temperature could be achieved under the same gas flow rate conditions as those under the atmospheric pressure condition described in Example 1.

TABLE 2

| Test items | Test conditions |
|---|---|
| Flow rate of fuel gas (natural gas) [Nm$^3$/h] | 4 |
| Total flow rate of oxygen gas (high-temperature oxygen gas) [Nm$^3$/h] | 195 |
| Temperature of discharged gas (high-temperature oxygen gas) [° C.] | 500 |
| Oxygen concentration in discharged gas (high-temperature oxygen gas) [% by volume] | 92.8 |
| Average velocity U1 in fuel flow path [m/s] | 17.5 |
| Average velocity U2 in first oxygen flow path [m/s] | 65 |
| Average velocity U3 in second oxygen flow path [m/s] | 65 |
| Average velocity U4 at outlet of combustion chamber [m/s] (Mixed gas of fuel gas and oxygen gas for combustion) | 4 |

Comparative Example 1

Figure 5:
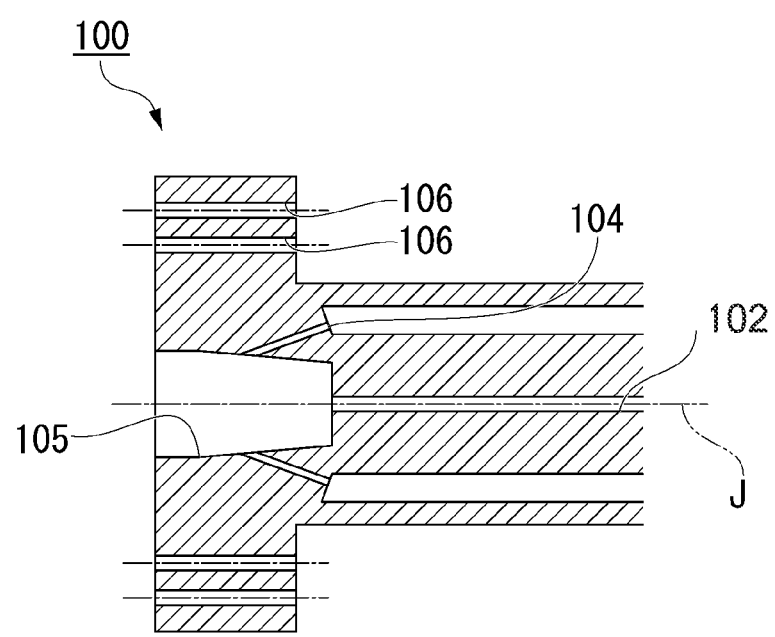
FIG. 5 is a cross-sectional view showing a burner provided in a conventional high-temperature oxygen generation device.

In Comparative Example 1, the conventional high-temperature oxygen generation device having a specification with atmospheric supply pressure and including the burner 100 shown in FIG. 5 and which includes the fuel flow path 102 which communicates with the combustion chamber 105 on the center axis J, and the flow path 104 of oxygen for combustion which corresponds to the second oxygen flow path 4 shown in FIGS. 1 and 2 around the fuel flow path 102, but does not include an oxygen flow path corresponding to the first oxygen flow path 3 shown in FIG. 1, was used to examine whether or not preheating was possible at each set preheating temperature.

The burner 100 of the comparative example shown in FIG. 5 has the flow path for oxygen to be heated 106, which is arranged around the flow path 104 for oxygen for combustion and is provided in two rows, the inner peripheral side and the outer peripheral side.

That is, in Comparative Example 1, since the downstream side of the preheating chamber was open to the atmosphere, each flow path outlet provided in the burner 100 was under atmospheric pressure.

Further, in Comparative Example 1, the burner 100 was used, which was designed so that the ejection velocity of the fuel ejected from the fuel flow path 102 was 17.5 m/s and the ejection velocity of oxygen for combustion ejected from the flow path 104 for oxygen for combustion was 65 m/s under atmospheric pressure conditions.

Then, in Comparative Example 1, when the preheating temperature was set in the range of 200° C. to 700° C. at every 100° C., whether preheating was possible or impossible was examined, and the results are shown in Table 3.

Table 3 below also shows the results of the same test using the devices of Example 1 (atmospheric pressure), Example 2 (high pressure: 0.7 MPaG), and Comparative Example 2 below. Also, in Table 3 below, "○" is marked in the column of the conditions for which it was confirmed that preheating is possible.

As shown in Table 3 below, when the high-temperature oxygen generation device of Examples 1 and 2 according to the present invention was used, the preheating temperature could be realized in the range of 200 to 700° C. On the other hand, in the high-temperature oxygen generation device using the burner 100 of Comparative Example 1, it was possible to preheat in the entire range of 200 to 700° C. under atmospheric pressure conditions, but it was impossible to preheat to 200° C. under high pressure, and it was impossible to carry out the test in which the preheating was higher than 200° C.

MPaG, the ejection velocity of the fuel ejected from the fuel flow path 102 was 17.5 m/s, and the ejection velocity of oxygen for combustion ejected from the combustion oxygen flow path 104 was 65 m/s.

As shown in Table 3 above, in the high-temperature oxygen generation device including the burner 101 of Comparative Example 2, it was possible to preheat in the entire range of 200° C. to 700° C. under high-pressure conditions, and under atmospheric pressure, the combustion conditions were unstable to preheat to 300° C. and it was impossible to carry out the test in which the preheating temperature was higher than 300° C.

Evaluation Result

From the results of the examples above, it is clear that the high-temperature oxygen generation device according to the present invention could preheat oxygen corresponding to a wide range of pressure conditions from normal pressure to high pressure which could not be achieved by the conventional high-temperature oxygen generation device.

INDUSTRIAL APPLICABILITY

The high-temperature oxygen generation device according to the present invention has a specification with high supply pressure, but can also be used under atmospheric pressure, and can efficiently supply preheated high-temperature oxygen gas regardless of pressure conditions from normal pressure to high pressure, without requiring upsizing or expansion of the equipment. Accordingly, the high-temperature oxygen generation device and the high-temperature oxygen generation method according to the present invention is suitable for heating in a furnace in various industrial furnaces.

EXPLANATION OF REFERENCE NUMERAL 10, 10A, 10B high-temperature oxygen generation device
1, 1A, 1B burner
1a tip
2 fuel flow path

TABLE 3

| Preheating temperature [° C.] | Example 1 Atmospheric pressure | Example 2 0.7 [MPaG] | Comparative Example 1 Atmospheric pressure | Comparative Example 1 0.7 [MPaG] | Comparative Example 2 Atmospheric pressure | Comparative Example 2 0.7 [MPaG] |
|---|---|---|---|---|---|---|
| 200 | ○ | ○ | ○ | x | ○ | ○ |
| 300 | ○ | ○ | ○ | — | x | ○ |
| 400 | ○ | ○ | ○ | — | — | ○ |
| 500 | ○ | ○ | ○ | — | — | ○ |
| 600 | ○ | ○ | ○ | — | — | ○ |
| 700 | ○ | ○ | ○ | — | — | ○ |

Comparative Example 2

In Comparative Example 2, the high-temperature oxygen generation device having a specification with high supply pressure including the conventional burner 101 shown in FIG. 5 was used to examine whether or not preheating was possible at each set preheating temperature.

That is, in Comparative Example 2, the ambient pressure was set to a high pressure of 0.7 MPaG, and each flow path outlet in the burner 101 was set to high-pressure conditions.

Further, in Comparative Example 2, the burner 101 was used in which when the ambient pressure was as high as 0.7

3 first oxygen flow path
4 second oxygen flow path
5 combustion chamber
6 flow path for oxygen to be heated
7 preheating chamber
70a tip
8 oxygen lance
8a discharge port
8b flow path 8b
81 flange
9 ignition burner 11 cooling jacket
11a cooling water flow path
11b entrance pipe
11c exit pipe
J center axis
W cooling water
G1 fuel gas
G2 oxygen gas for combustion
G3 oxygen gas to be heated
G4 high-temperature gas
G5 high-temperature oxygen gas

The invention claimed is:

1. A high-temperature oxygen generation device in which a high-temperature gas and an oxygen gas to be heated are mixed to generate a high-temperature oxygen gas,
wherein the high-temperature oxygen generation device includes a burner which generates the high-temperature gas, and a preheating chamber which is provided on the downstream side of the burner and mixes the high-temperature gas and the oxygen gas to be heated, and the burner includes:
a combustion chamber which forms a flame by a fuel gas and an oxygen gas for combustion;
a fuel flow path which supplies the fuel gas into the combustion chamber;
at least one flow path for oxygen for combustion which supplies the oxygen gas for combustion into the combustion chamber; and
a flow path for oxygen to be heated which communicates with the preheating chamber, and supplies the oxygen gas to be heated toward the preheating chamber,
wherein the burner includes:
a first oxygen flow path of the at least one flow path for oxygen for combustion which is provided on the center axis of the burner and ejects the oxygen gas for combustion on the center axis of the burner as the flow path for oxygen for combustion;
the fuel flow path which is arranged around the first oxygen flow path, and ejects the fuel gas along the axis direction of the burner; and
a second oxygen flow path of the at least one flow path for oxygen for combustion which is arranged around the fuel flow path, and ejects the oxygen gas for combustion so as to be directed toward the center axis of the burner while inclining with respect to the center axis of the burner as the flow path for oxygen for combustion;
the flame is formed by the fuel gas ejected from the fuel flow path and the oxygen gas for combustion ejected from the first oxygen flow path and the second oxygen flow path in the combustion chamber, and
the flow path for oxygen to be heated communicates with the preheating chamber, arranged around the second oxygen flow path, ejects the oxygen gas to be heated around the flame, and supplies the oxygen gas to be heated toward the preheating chamber.

2. The high-temperature oxygen generation device according to claim 1, wherein the high-temperature oxygen generation device further includes a cooling jacket which cools the burner or both the burner and the preheating chamber.

3. A high-temperature oxygen generation method using the high-temperature oxygen generation device according to claim 1,
in a case when the high-temperature oxygen is supplied at a maximum pressure, an average velocity of the fuel gas in the fuel flow path of the burner is U1, an average velocity of the oxygen gas for combustion in the first oxygen flow path is U2, and an average velocity of the oxygen gas for combustion in the second oxygen flow path is U3, these average velocities U1, U2, and U3 satisfy the following equations (1) to (3), and
in a case at the rated flow rate under atmospheric pressure conditions, an average velocity U4 of a mixed gas of the fuel gas and the oxygen gas for combustion on an outlet side of the combustion chamber satisfies the following equation (4)

$$10 \text{ (m/s)} \leq U1 \leq 60 \text{ (m/s)} \tag{1}$$

$$20 \text{ (m/s)} \leq U2 \leq 120 \text{ (m/s)} \tag{2}$$

$$20 \text{ (m/s)} \leq U3 \leq 120 \text{ (m/s)} \tag{3}$$

$$U4 \leq 60 \text{ (m/s)} \tag{4}.$$

* * * * *